United States Patent [19]

Tran

[11] Patent Number: 5,191,418
[45] Date of Patent: Mar. 2, 1993

[54] METHOD FOR THE PROCESSING OF DIGITAL CONTROL DATA ASSOCIATED WITH AN HD-MAC TYPE VIDEO SIGNAL AND DEVICE FOR THE IMPLEMENTATION OF THE METHOD

[75] Inventor: Francis Tran, Illkirch, France

[73] Assignee: Laboratoire Europeen de Recherches Electroniques Avancees, Societe En Nom Collectif, Courbevoie, France

[21] Appl. No.: 658,335

[22] Filed: Feb. 20, 1991

[30] Foreign Application Priority Data

Feb. 23, 1990 [FR] France .................... 90 02259

[51] Int. Cl.$^5$ ............ H04N 7/00; H04N 11/00; H04N 7/12
[52] U.S. Cl. .................... 358/142; 358/141; 358/146
[58] Field of Search .......... 358/141, 142, 146, 147, 358/12, 14, 160

[56] References Cited

U.S. PATENT DOCUMENTS

| | | | |
|---|---|---|---|
| 4,789,860 | 12/1988 | Brennand et al. | 340/825.51 |
| 4,794,447 | 12/1988 | Tsinberg | 358/14 |
| 4,866,522 | 9/1989 | Beckley | 358/145 |
| 5,029,000 | 7/1991 | Colombo | 358/133 |
| 5,043,810 | 8/1991 | Vreeswijk et al. | 358/133 |

FOREIGN PATENT DOCUMENTS 0342756 11/1989 European Pat. Off. .
0349454 1/1990 European Pat. Off. .
0386805 9/1990 European Pat. Off. .

OTHER PUBLICATIONS

"HDTV Motion Adaptive Bandwidth Reduction Using DATV", R. Storey B. Sur, C. Evg., M.I.E.E. Research Department, BBC Jun., 1986, pp. 1-7.
"HD-MAC: A Step Forward in The Evolution of Television Technology", Annegarn et al., Phillips Technical Review, vol. 43, No. 8, Aug. 1987, pp. 198-211.
"Television Engineering Research in the BBC, Today and Tomorrow", Bruce Moffat, SMPTE Journal, Jan. 1988, pp. 17-24.

Primary Examiner—James J. Groody
Assistant Examiner—Safet Metjahic
Attorney, Agent, or Firm—Oblon, Spivak, McClelland, Maier & Neustadt

[57] ABSTRACT

Disclosed is a method for the processing of digital control data associated with an HD-MAC type video signal as well as a device for the implementation of the method. In this method, during one processing period, the digital control data associated with the video signal of the following processing period is decoded. The digital control data corresponding to n successing processing periods (n≧2) is stored and then the data thus stored is decoded on a time sharing basis so as to achieve the output, in parallel, of the desired pieces of digital control data with their specific delay. Application to high-definition television.

10 Claims, 4 Drawing Sheets

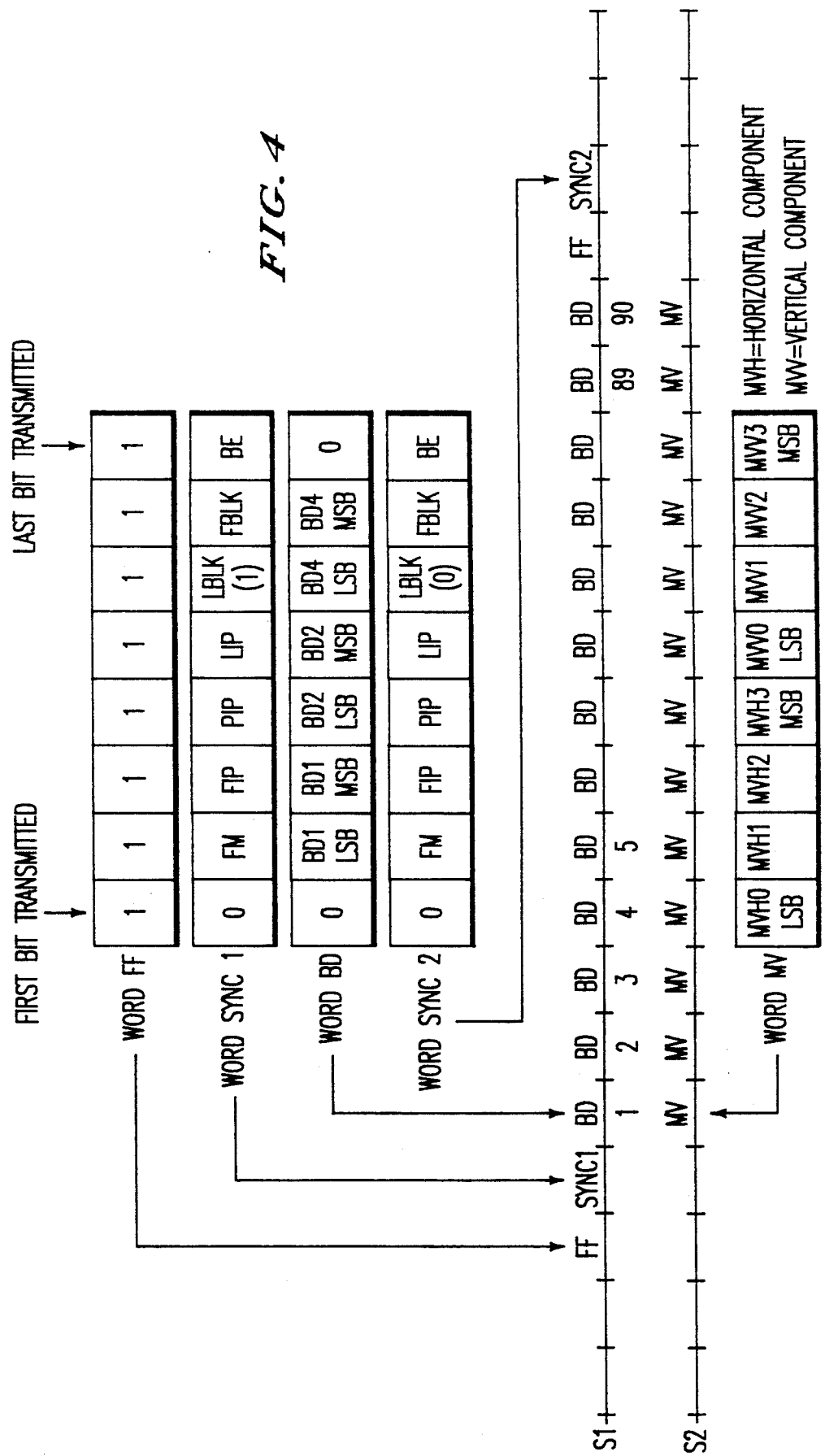

METHOD FOR THE PROCESSING OF DIGITAL CONTROL DATA ASSOCIATED WITH AN HD-MAC TYPE VIDEO SIGNAL AND DEVICE FOR THE IMPLEMENTATION OF THE METHOD

BACKGROUND OF THE INVENTION

1. Field of the Invention

The present invention relates to a method for the processing of digital control data associated with an HD-MAC type of video signal as well as to a device for the implementation of this method.

2. Description of the Prior Art

The general problem encountered in the transmission of video signals in high-definition television lies in the fact that the transmission channels are too narrow. Thus, in the case of an HD-MAC type video signal, a bandwidth reduction by a factor of about 4 needs to be obtained. To make this transmission, the participants in the Eureka project have developed and perfected a bandwidth reduction system that performs well, for it achieves an efficient compromise between the restitution of the frame with very good resolution of the frame (spatial definition) and temporal restitution of the frame. The principle chosen consists in adapting the compression mode to the temporal resolution of the frame that has to be transmitted. Depending on the standard chosen, three possible compression modes, called the 80 ms, 20 ms and 40 ms compression modes, are used. Each of these modes preserves the spatial definition or the temporal resolution of the frame, or achieves a compromise between these two qualities. In this case, therefore, an adaptive processing of the video signal is used. To carry out this processing, digital control data has to be transmitted in addition to the video signal. This digital control data contains synchronization information and information on the type of processing to be performed, such as motion vector data or data on the transmission mode. This data is generally known as digital assistance data and is referenced DATV (digitally-assisted television) information. Consequently, the receivers should be capable of decoding this digital control data in order to be capable of processing the HD-MAC type of video signal.

The DATV data associated with an HD-MAC type video signal is therefore decoded in a decoding system such as the one shown in FIG. 1. As described notably in the articles of the IEEE Conference Publication 293 in 1988, the pieces of digital assistance data more particularly include data indicating the transmission mode used or branch decision data, referenced "BD" and motion vector data, referenced MV. All this data is encoded on 11 bits, and concerns a frame block. As shown in FIG. 1, the decoding device has two memories referenced RAM1, RAM2 (RAM=random-access memory), each memory being capable of storing the DATV data corresponding to a processing period, namely an even frame and an odd frame. For the example considered above, each memory has a capacity of at least 6480 eleven-bit words. As shown in FIG. 1, these two memories are connected to the decoder 1. The decoder 1 has a circuit for the control of the memories RAM1 and RAM2. This control circuit receives the DATV data at its input and manages the functioning of the memories RAM1 and RAM2 in reading and writing modes as shall be described hereinafter. The decoder 1 also has a time base 3 which is connected to the control circuit 2 and receives a control signal. The time base emits different synchronization signals respectively referenced SYNCHRO 0, SYNCHRO 1, SYNCHRO 2, ..., SYNCHRO X towards processing circuits external to the decoder. Furthermore, the decoder 1 has a ROM (read-only memory) 4 in which a decoding table 4 is stored. This memory 4 is connected to the output of the control circuit 2. A multiplexer 5 is connected to the output of the memory 4. At its input, this multiplexer 5 receives the branch decision data BD contained in the DATV data. It respectively receives the branch decision data BD of the odd frame referenced BD-OFR and the branch decision data from the even frame referenced BD-EFR. At its output, it gives a piece of decoded branch decision information that is sent to a delay circuit 6 compensating for the delay due to the processing of the other DATV data as shall be explained in detail hereinafter. At the output of the circuit 6, therefore, a non-delayed piece of branch decision information referenced BD0 is obtained. Furthermore, the output of the memory ROM4 is connected to a motion vector MV data address processing circuit. At its output, this circuit gives the motion vector data, referenced MV-EFR, corresponding to the even frame, and the motion vector data, referenced MV-OFR, corresponding to the odd frame. This data is multiplexed in the multiplexer 8 in such a way that the the non-delayed piece of motion vector data MV0 is obtained at its output. In fact, the DATV data encoded in a processing period corresponding to an even frame and an odd frame, namely 80 ms, is transmitted 80 ms before the corresponding video signal. This explains the use of two memories RAM1 and RAM2, alternately used in reading mode and in writing mode. Thus, during the processing of the DATV data stored beforehand in the the memory RAM1, which then works in reading mode, the DATV data of the next processing period is stored in the memory RAM2 which works in writing mode. With this decoding device, therefore, at the output of the decoder, we obtain the decoded branch decision data BD0 on two bits and the decoded motion vector data MV0 on 8 bits. However, this BD0 and MV0 data should be delayed, for the video signal processing circuit, called a passband reduction decoder, uses also the data BD4, BD2, BD1 delayed respectively by 20 ms, 60 ms, 80 ms with respect to BD0 and the data MV2 which is delayed by 60 ms with respect to MV0 to carry out the appropriate processing of the video signal as a function of the compression mode used. As shown in FIG. 1, this delay is created by using delay circuits such as field memories which may give delays of 20 ms or more. These memories are referenced 9a, 9b, 9c, 9d and 10a, 10b, 10c in FIG. 1. Consequently, the branch decision data BD4 is obtained at the output of the memory 9a, the branch decision data BD2 is obtained at the output of the memory 9c and the branch decision data BD1 is obtained at the output of the memory 9d while the motion vector data MV2 is obtained at the output of the circuit 10c.

Furthermore, as shown in FIG. 1, in addition to the additional assistance data BDX and MVX, the decoder 1 should also generate several time-lagged versions of the synchronization signals. These synchronization signals may notably include line-synchronization, line-parity, field-parity and frame-parity information. These synchronization signals with their specific delay should be connected to different circuits in the processing device of the video signal. The delays may vary from some clock cycles (37 ns) to several line periods (32 μs). Consequently, as shown in FIG. 1, the transmission of all these signals in parallel makes it necessary to have a large number of interconnections on the printed circuit. Furthermore, the delay circuits are made by means of additional integrated circuits. This leads to a high cost for the making of the entire decoding device.

The present invention is therefore aimed at overcoming these drawbacks by proposing a new method for the processing of control digital data associated with an HD-MAC type of video signal as well as a new device for the implementing of this device.

SUMMARY OF THE INVENTION

Consequently, an object of the present invention is a method for the processing of digital control data associated with an HD-MAC type video signal in which, in one processing period, the digital control data associated with the video signal of the next processing period is decoded, wherein the digital control data corresponding to n successive periods (N≧2 is stored and then, on a time-sharing basis, the data thus stored is decoded so as to achieve the parallel output of the desired pieces of digital control data with their specific delay.

Preferably, the processing period corresponds to the period of transmission of two frames, respectively an even frame and an odd frame.

According to a preferred embodiment of the present invention, the storage of the digital control data is done in n+1 memories managed by circular permutation, one of the memories being in writing mode while the other memories are in reading mode. According to another characteristic of the present invention, the pieces of digital control data obtained at an output of the decoder, as well as the pieces of synchronization data, are transmitted to the processing circuits by means of at least one series bus having two one-bit signal lines. This makes it possible to reduce the number of outputs provided on the printed circuit for making the decoding device. Indeed, the pieces of synchronization information as well as the pieces of digital assistance information are sent successively towards the processing circuits that need them with their own delay, the circuits themselves generating the delay of the synchronization signals.

The present invention also concerns a device for the implementation of the above method.

According to the present invention, this device has three memories, each of which is capable of storing the digital control data relating to a processing period, a memory control circuit receiving the digital control data (DATV) and managing the memories by circular permutation, a time base connected to the control circuit and generating synchronization signals, a decoding table connected to the output of the control circuit, a locking circuit connected to the output of the decoding table, a first address processing circuit (MV) connected to the output of the decoding table and delivering, in parallel, the motion vector data (MV) of an even frame and an odd frame corresponding to a first processing period, a second address-processing circuit (MV) connected to the output of the locking circuit and delivering, in parallel, the motion vector data (MV) of an even frame and an odd frame corresponding to a second processing period, a multiplexer for receiving motion vector data (MV) coming from the two address processing circuits and delivering, in parallel, the data MV0 and MV2, a multiplexer receiving, at input of the decoding table and of the locking circuit respectively, the branch decision data (BD) of an even frame and of an odd frame corresponding to the two successive processing periods and a delay circuit connected to the output of the multiplexer and delivering, in parallel, the data (BD0, BD1, BD2 and BD4).

According to another characteristic, the above device further has a series bus formatting device receiving, at its input, the decoded digital control data BD0, BD1, BD2, BD4 and MV0, MV2 as well as synchronization information and sending it in series to at least one bus constituted by two one-bit signal lines.

BRIEF DESCRIPTION OF THE DRAWINGS

Other characteristics and advantages of the present invention will appear from the following description of a preferred embodiment of a decoding device implementing the processing method according to the present invention, the description being made with reference to the appended drawings, of which.

DETAILED DESCRIPTION OF THE INVENTION

Figure 1:
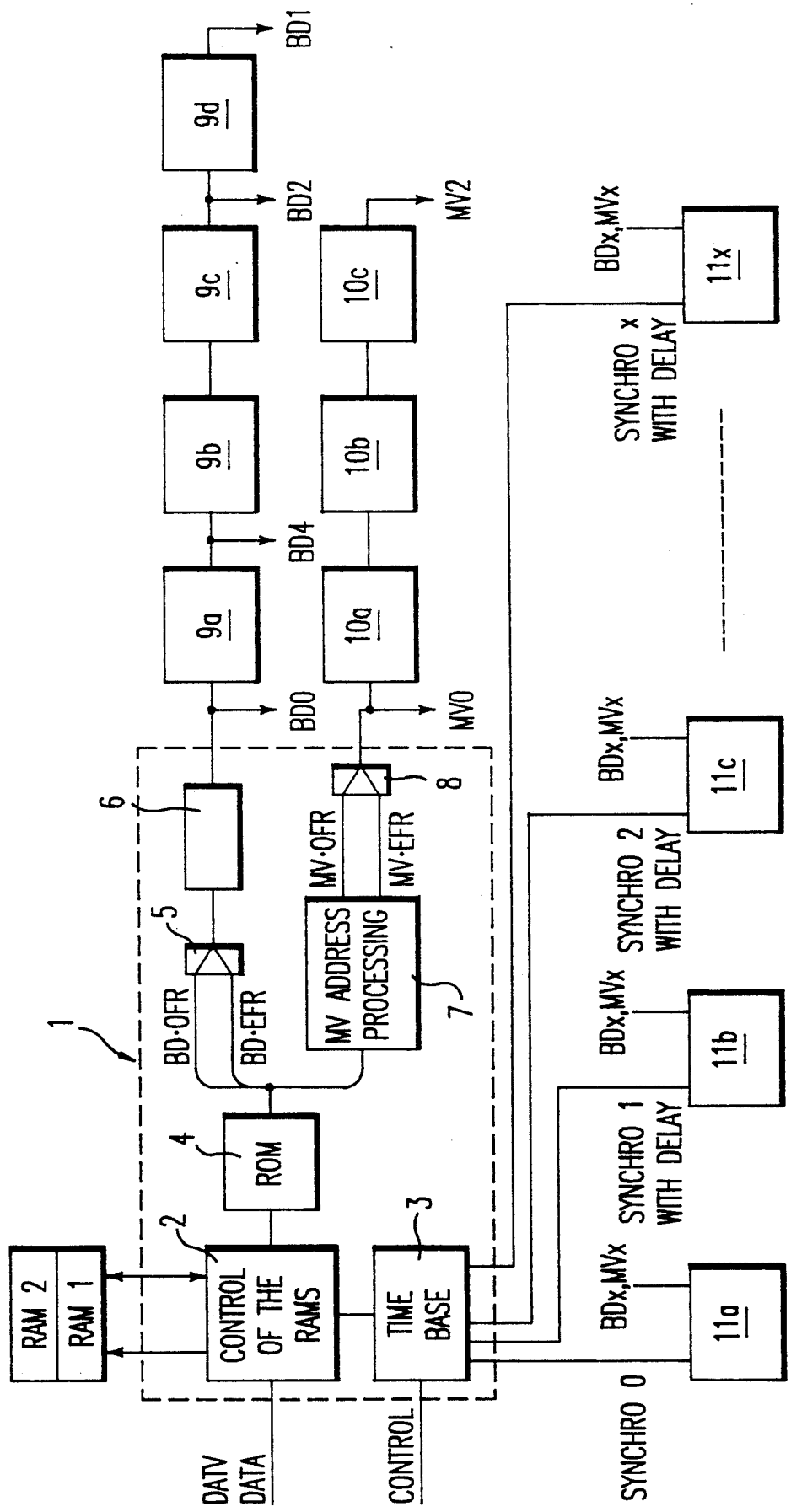
FIG. 1, already described, is a block diagram of a decoding device according to the prior art.
Figure 2:
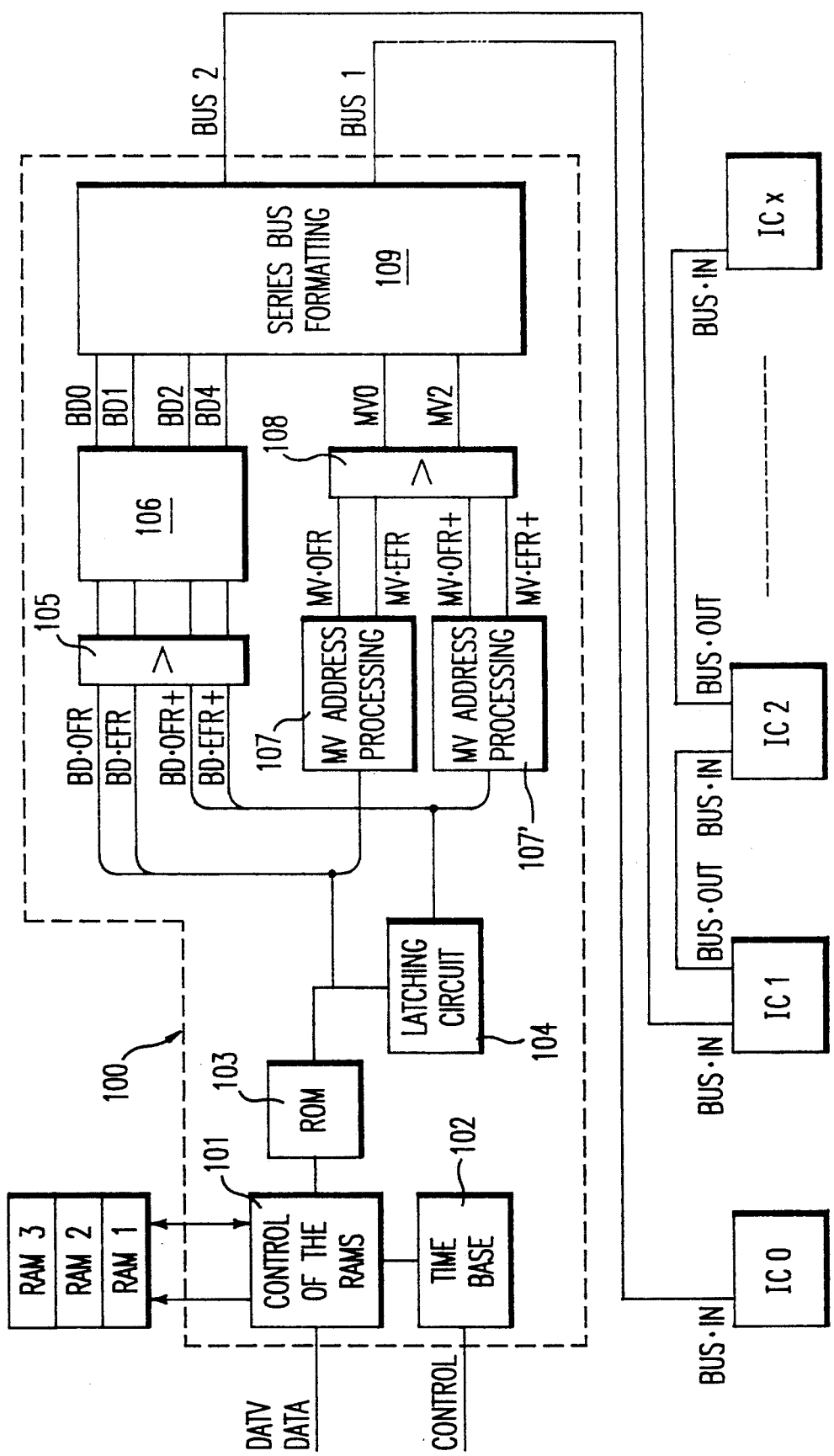
FIG. 2 is a block diagram of a decoding device according to the present invention.

Referring to FIG. 2, we shall now describe a preferred embodiment of a device for the decoding of the DATV digital control data associated with an HD-MAC type of video signal according to the present invention. Thus, this decoding device has three memories RAM1, RAM2, RAM3 designed to store the digital control information corresponding to two 80 ms periods. Preferably, each memory RAM1, RAM2, RAM3 has a capacity of at least 6480 eleven-bit words. The storage of the DATV digital control data corresponding to two 80 ms periods makes it possible to obtain, in parallel, the decoded digital control information BD0, BD1, BD2, BD4 and MV0, MV2 as shall be explained in greater detail here below. Furthermore, the decoder 100 itself has a circuit 101 for the control of the RAMs. This circuit 101 is substantially identical to the RAM control circuit of the decoder of FIG. 1. This RAM control circuit receives the DATV data at its input and manages the memories RAM1, RAM2, RAM3 by circular permutation. The RAM control circuit 101 is connected to a time base 102 which receives control signals or clock signals and sends synchronization signals to different circuits. Furthermore, the decoder 100 has a decoding table stored in a ROM 103. This memory 103 is connected to the output of the RAM control circuit 101. The memory 103 is connected to a latching circuit 104. The decoder 100 further has a first multiplexer 105 that receives, at its input, branch decision data of the even and odd frames (BD-EFR* and BD-OFR*) coming from the latching circuit 104 as well as the branch decision data of the even and odd frames (BD-EFR and BD-OFR) coming directly from the decoding table 103. The output of the multiplexer 105 is sent to a delay circuit 106 compensating for the delays resulting from the processing of other data and giving, at its output, the branch decision data with the specific delays desired BD0, BD1, BD2, BD4. Furthermore, the decoder 100 includes two motion vector MV address processing circuits 107 and 107'. The circuit 107 is directly connected to the output of the decoding table 103 while the circuit 107' is connected to the output of the latching circuit 104. These processing circuits 107 and 107' give, at their outputs, the motion vector data corresponding to the even and odd frames of the first processing period referenced MV-EFR* and MV-OFR* for the circuit 107' and the motion vector data corresponding to the eve and odd frames of the second processing period referenced MV-EFR and MV-OFR for the processing circuit 107. The motion vector data MV-OFR*, MV-EFR*, MV-OFR, MV-EFR are sent to the input of a multiplexer 108 giving the motion vector data MV0 and MV2 at its output. Furthermore, according to the present invention, all the pieces of digital control data with their specific delay BD0, BD1, BD2, BD4, MV0, MV2, as well as the pieces of synchronization information coming from the time base 102, are sent to a series bus formatting circuit 109 that enables the necessary digital control data to be sent on two series buses BUS 1 and BUS 2, each formed by two one-bit signal lines, to different video signal processing circuits respectively referenced IC0, IC1, IC2, . . . , ICX. As shown in FIG. 2, the information transmitted by the series bus BUS 1 is sent to the processing circuit IC0. In fact, the series bus BUS 1 transmits only the digital control data BD0 and MV0 to the circuit IC0. As regards the line referenced BUS 2, formed by two one-bit signal lines S1 and S2, it transmits all the other digital control data as well as synchronization information to the other video signal processing circuits IC1, IC2. . . ICX. The type of encoding used for this transmission will be explained with reference to FIG. 4.

Specifically, the signal line S1 is used for the transmission of digital control data BD1, BD2, BD4 and signals encoded on eight bits. The transmission sequence, taking a 32 μs HDTV line as the reference, may be, for example, the one shown in FIG. 4. The first word transmitted on the line S1 is a word FF. The word FF is a specific word signifying that the next word is a synchronization word. It may be encoded in the form 11111111.

The second word transmitted on S1 is the word SYC1 which is a synchronization word. This word has a first bit set at "0" followed by seven bits giving information, notably at the start of a line, the end of a line and the parity of a frame as shown in FIG. 4. Then, 90 successive words containing branch decision data BD pertaining to a frame will be transmitted on the line S1, each word BD containing the data BD1, BD2, BD4 and beginning with a "0" bit. At the end of the 90 words BD, a second word FF is sent, and then a synchronization word SYC2, giving notably information on the end of lines. Furthermore, as shown in FIG. 4, data relating to the motion vector MV2 is transmitted on the line S2 in the form of eight-bit words in phase with the data BD. The word MV includes information on the horizontal components MVH and the vertical components MVV of a motion vector word MV.

As shown in FIG. 2, the series bus BUS 2 is connected at an input of the circuit IC1 to the input referenced BUS-IN, then the information sent to the series bus BUS 2 is propagated through the other circuits IC2, . . . , ICX in being connected between the outputs BUS-OUT and the inputs BUS-IN of these circuits. Consequently, each circuit is responsible for the output of the series bus and transmits the data flowing in the series bus BUS 2 towards the next circuit with an inherent delay corresponding to its own delay. Thus, the DATV data given by the series bus is still in phase with the video data.

The use of this series bus for the transmission of the decoded DATV digital control data significantly reduces the number of outputs on the DATV decoder 100 as well as the number of interconnections on the printed circuit. The propagation from the series bus, from one circuit to another, in phase with the video data also simplifies the designing of the interface between the DATV decoder and all the other circuits, as shown in FIG. 2.

Figure 3A:
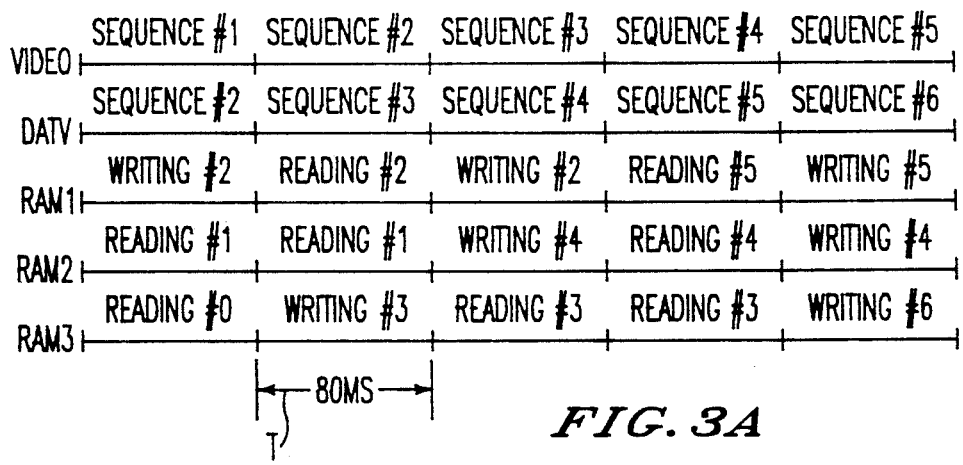
FIG. 3A-3C diagrams explaining the method for the processing of digital control data associated with an HD-MAC type of video signal made in the device of FIG. 2, and FIG. 4 gives the timing diagram of a two-line series bus.
Figure 3B:
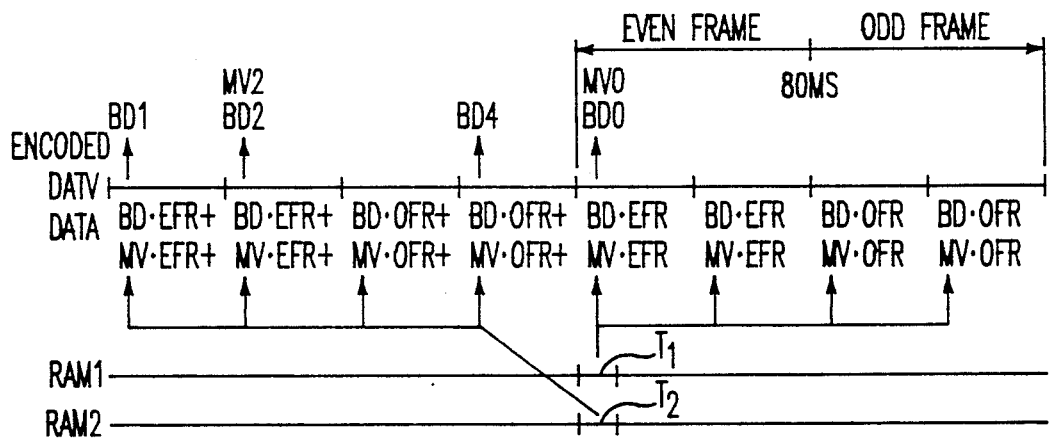
Figure 3C:
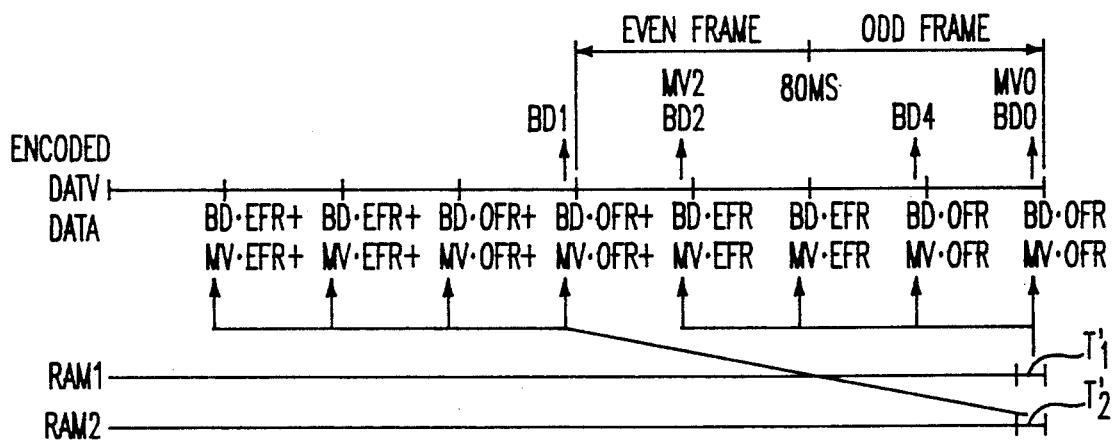

Referring to FIG. 3, we shall now give a rather more detailed description of the working of the decoder of FIG. 2. As shown in FIG. 3, when the video signals are sent according to the sequences 1, 2, 3, 4, 5, the associated digital control data is sent according to the sequences 2, 3, 4, 5, 6. Indeed, the digital control data associated with a video sequence precedes the video sequence. The DATV digital control data is recorded in the memories RAM1, RAM2, RAM3 managed by circular permutation in the manner shown in the timing diagram of FIG. 3a. Thus, when the RAM1 in writing mode to receive the digital control data DATV relating to the sequence 2, the memories RAM2 and RAM3 are in reading mode and enable the reading of the DATV digital control data relating respectively, to the sequence 1 and the sequence 0. Then, when the memory RAM1 is in reading mode for the DATV digital control data relating to the sequence 2, the memory RAM2 is still in reading mode so as to give the data relating to the sequence 1, and the memory RAM3 goes into writing mode so as to record the data relating to the sequence 3, and so on and so forth as shown in the timing diagram of FIG. 3A. FIGS. 3B and 3C show an example of decoded DATV data making it possible to obtain the desired set of pieces of digital control data with their specific delay. Referring to FIGS. 3B and 3C, we shall now describe the way to decode the DATV data corresponding to the video sequence 2 referenced T in FIG. 3A. This sequence 2 corresponds to an even frame and to an odd frame and has a duration of 80 ms. In this case, the memory RAM1 contains the 6480 encoded words corresponding to the digital control data of the sequence 2. The cycle T1 shown in FIG. 3B corresponds to the reading cycle of the word 1 in the memory RAM1. The decoding of this word gives the branch decision BD and motion vector MV digital control data relating to the sequence 2. In the same way, the memory RAM2 contains the 6480 encoded words of the DATV digital control data relating to the sequence 1. This cycle, referenced T2, represents the reading cycle of the word 1 in the memory RAM2. The decoding of this word gives the digital control data relating to the sequence 1. In suitably selecting the information decoded above, all the necessary versions of the branch decision data BD and motion vector data MV can be obtained. Thus, in the case of FIG. 3B, we have BD0=BD-EFR, BD1=BD-EFR*, BD2=BD-EFR*, BD4=BD-OFR*, MV0=MV-EFR, MV2=MV-EFR*.

Referring to FIG. 3C, we shall now describe the mechanism used to obtain the digital control data BD and MV at the end of the sequence 2. In this case, the cycle T'1 represents the reading cycle of the 6480th word in the memory RAM1. The decoding of this word gives the data BD and MV relating to the sequence 2. In the same way, the cycle T'2 represents the reading cycle of the 6480th word in the RAM2. The decoding of this word gives digital control data BD and MV relating to the sequence 1. In this case too, by an appropriate selection of the above digital data, all the versions of BD and MV may be obtained: thus BD0=BD-OFR, BD1=BD-OFR*, BD2=BD-EFR, BD4=BD-OFR, MV0=MV-OFR, MV2=MV-EFR.

The above examples show two extreme cases, namely the start and the end of the sequence 2. Any other intermediate case may be decoded by using the same mechanism. In any case, the DATV data coming from two successive sequences is necessary to obtain all the delayed versions of the data DB and MV as shall be seen clearly in FIGS. 3B and 3C.

The use of the decoder therefore makes it possible to eliminate the delay circuits as well as the 20 ms field memories used in the prior art decoding circuits. These circuits are replaced by a single memory RAM2 of 6480 eleven-bit words, thus substantially reducing the cost of the circuit.

What is claimed is:

1. A method for decoding digital control data associated with an HD-MAC type video signal, comprising the steps of:

storing, in a plurality of memories, digital control data corresponding to N (N≧2) successive processing periods, the digital control data comprising motion vector data and branch decision data:

outputting in parallel, through a first processing circuit, motion vector data of an even frame and an odd frame corresponding to a first processing period;

outputting in parallel, through a second processing circuit, motion vector data of an even frame and an odd frame corresponding to a second processing period;

multiplexing, through a first multiplexer, the output motion vector data of the first and second processing periods and outputting, in parallel, first non-delayed motion vector data and second delayed motion vector data;

multiplexing and outputting, through a second multiplexer, branch decision data of an even frame and an odd frame of the first and second processing periods; and delaying the branch decision data and outputting in parallel first non-delayed branch decision data, second delayed branch decision data, third delayed branch decision data and fourth delayed branch decision data.

2. The method according to claim 1, wherein the storage of the digital control data is done in N+1 memories managed by circular permutation, one of the memories being in a writing mode while the other memories are in a reading mode.

3. The method according to claim 2, wherein each memory has a capacity of 6480 eleven-bits words.

4. The method according to claim 1, wherein the digital control data is comprised of the first non-delayed branch decision data, the second delayed branch decision data delayed by 20 ms, the third delayed branch data delayed by 60 ms and the fourth delayed branch data delayed by 80 ms, and by the first non-delayed motion vector data and the second delayed motion vector data delayed by 60 ms.

5. The method according to claim 1, further comprising the step of transmitting the digital control data and synchronization data to the first and second processing circuits by means of at least one series bus having two one-bit signal lines.

6. The method according to claim 5, wherein a first line is used for the transmission of the delayed branch decision data and of the synchronization data, and a second line is used for transmission of the delayed motion vector data in phase with the non-delayed branch decision data.

7. The method according to claim 6, wherein the transmission sequence of the first line is based on an HDTV (high-definition television) line and has a specific word, a first synchronization word, 90 branch decision words, each including the first, second and third delayed branch decision data a second specific word and a second synchronization word.

8. The method according to claim 5, wherein the non-delayed branch decision data and non-delayed motion vector data is transmitted to the first and second processing circuits by means of a second series bus including two one-bit line signals.

9. A device for decoding digital control data associated with an HD-MAC type video signal comprising:

a plurality of memories, each of which is capable of storing digital control data, which comprises motion vector data and branch decision data, relating to a processing period;

a memory control circuit for receiving the digital control data from the memories and managing the memories by circular permutation;

a time base connected to the control circuit for generating synchronization signals;

a storing means connected to the output of the control circuit for storing a decoding table;

a latching circuit connected to the output of the decoding table;

a first address processing circuit connected to the output of the storing means and delivering, in parallel, motion vector data of an even frame and an odd frame corresponding to a first processing period;

a second address-processing circuit connected to the output of the latching circuit and delivering, in parallel, motion vector data of an even frame and an odd frame corresponding to a second processing period;

a first multiplexer for receiving motion vector data from the two address processing circuits and delivering, in parallel, first non-delayed motion vector data and second delayed motion vector data;

a second multiplexer for receiving branch decision data of an even frame and of an odd frame corresponding to the two successive processing periods from the decoding table and the latching circuit; and a delay circuit connected to the output of the multiplexer and delivering, in parallel, first non-delayed branch decision data, second delayed branch decision data, third delayed branch decision data and fourth delayed branch decision data.

10. A device according to claim 9, further comprising a series bus formatting device receiving, at its input, the motion vector data and branch decision data as well as synchronization information and sending it in series to at least one bus constituted by two one-bit signal lines.

* * * * *